March 24, 1964 W. G. JOHNSON 3,125,906

LEAD BONDING MACHINE

Filed April 4, 1962 8 Sheets-Sheet 1

INVENTOR.
WALTER G. JOHNSON

BY

Harvey G. Lawhurst

ATTORNEY

INVENTOR.
WALTER G. JOHNSON
BY
Harvey S. Lawhurst
ATTORNEY

March 24, 1964
W. G. JOHNSON
3,125,906
LEAD BONDING MACHINE
Filed April 4, 1962
8 Sheets-Sheet 3

INVENTOR.
WALTER G. JOHNSON
BY Harvey G. Lambert
ATTORNEY

INVENTOR.
WALTER G. JOHNSON
BY
Harvey G. Lambert
ATTORNEY

March 24, 1964 — W. G. JOHNSON — 3,125,906

LEAD BONDING MACHINE

Filed April 4, 1962 — 8 Sheets-Sheet 5

INVENTOR.
WALTER G. JOHNSON
BY Harvey J. Lambert
ATTORNEY

INVENTOR.
WALTER G. JOHNSON
BY
Harvey J. Lambert
ATTORNEY

INVENTOR.
WALTER G. JOHNSON
BY
ATTORNEY

INVENTOR.
WALTER G. JOHNSON
BY
Harvey [signature]
ATTORNEY 3,125,906
LEAD BONDING MACHINE Walter G. Johnson, Santa Clara, Calif., assignor to Diotran Pacific, Palo Alto, Calif., a corporation of California Filed Apr. 4, 1962, Ser. No. 185,108
19 Claims. (Cl. 78—82)

This invention relates to bonding machines for bonding metallic leads to metallized surfaces and more particularly to a lead bonding apparatus for forming a compression bond or a thermo-compression bond between a metallic lead and a metallized surface.

The lead bonding machine of this invention may be utilized in connection with the forming of a compression or a thermo-compression bond between any metallic lead and metallized surface in accordance with the bonding characteristics of the materials to be bonded. By way of example, the machine of this invention will be described in connection with its particular application to the manufacture of transistors in which it bonds a gold lead by thermo-compression to a semiconductive member and a gold plated Kovar post. It is to be understood, however, that such particular application of the lead bonding machine of this invention is given merely by way of example and is not to be construed in a limiting sense.

Generally speaking, fabrication of semiconductor devices involves essentially two different phases, namely a chemical-physical phase and a mechanical phase. The chemical-physical phase includes the preparation of suitably doped materials having an excess of holes or electrons (p-type or n-type materials) which are produced by a number of well-known alloying and diffusion techniques. The mechanical phase usually involves the steps of providing the materials with a suitable housing (or support) and electrical connections. For example, the mechanical phase of producing silicon transistors includes the wafering and dicing of the doped silicon, mounting the dice on a header, bonding gold leads to the dice and connecting the free end of the bonded leads to the posts on the header. The machine of this invention will be described in connection with forming the bond between the gold lead and the dice and the gold lead and the posts.

Present day production techniques for attaching leads to semiconductive surfaces are slow and involve a great deal of hand labor. Automation techniques and production machines so frequently encountered in the production of other items are almost non-existing in the semiconductor industry. The maufacturer of semiconductor devices, being unable to purchase production equipment for his assembly lines, is therefore forced to design and build his own production machinery, a task usually requiring skills and background not readily available to him. As a result of this lack of available machinery, the semiconductor manufacturer often ends up with inefficient assembly tools for his assembly lines requiring skilled manpower for its operation and maintenance, resulting in low output and high manufacturing cost.

One of the prime requisites of forming a thermo-compression bond between a thin lead and a metallized surface is the use of moderate heat and moderate pressure, the temperature being selected to be below the dislocation forming temperature of the dice or the eutectic temperature of the materials involved and the pressure being selected to be below the pressure which either fractures the dice or grossly deforms the metallic lead. The combined moderate heat and pressure must be maintained for a certain length of time to produce a strong bond. Best results are obtained if the temperature, pressure and time of compression can be accurately controlled and uniformly reproduced so that a uniform product results.

Prior art machines have lacked in their ability to produce uniform bonds.

It is, therefore, an object of this invention to provide a lead bonding machine capable of producing uniform bonds.

It is a further object of this invention to provide a lead bonding machine for bonding leads to semiconductive surfaces.

It is another object of this invention to provide an automated lead bonding machine useful for bonding leads to semiconductive surfaces, which reduces production time, increases the uniformity of the bond and provides a more economical and reliable semiconductive device.

It is a still further object of this invention to provide a machine for speeding up the production rate of semiconductor devices making the manufacture of said devices more economical and providing greater uniformity of the devices.

It is still another object of this invention to automate the "nail-head" bonding and the "wedge" bonding of leads to devices such as transistors and diodes.

It is a general object of this invention to provide a compact, reliable, rugged and automated lead bonding machine for bonding metallic leads to metallized surfaces utilizing the technique of compression bonding or thermo-compression bonding depending on the bonding characteristics of the materials. The machine, once adjusted to provide a selected temperature, pressure and time of compression, is capable of uniform operation at the selected values of temperature, pressure and time of compression.

Other objects and a better understanding of this invention may be had by reference to the following description, taken in conjunction with the accompanying drawings in which.

Figures 7, 12A, 12B:
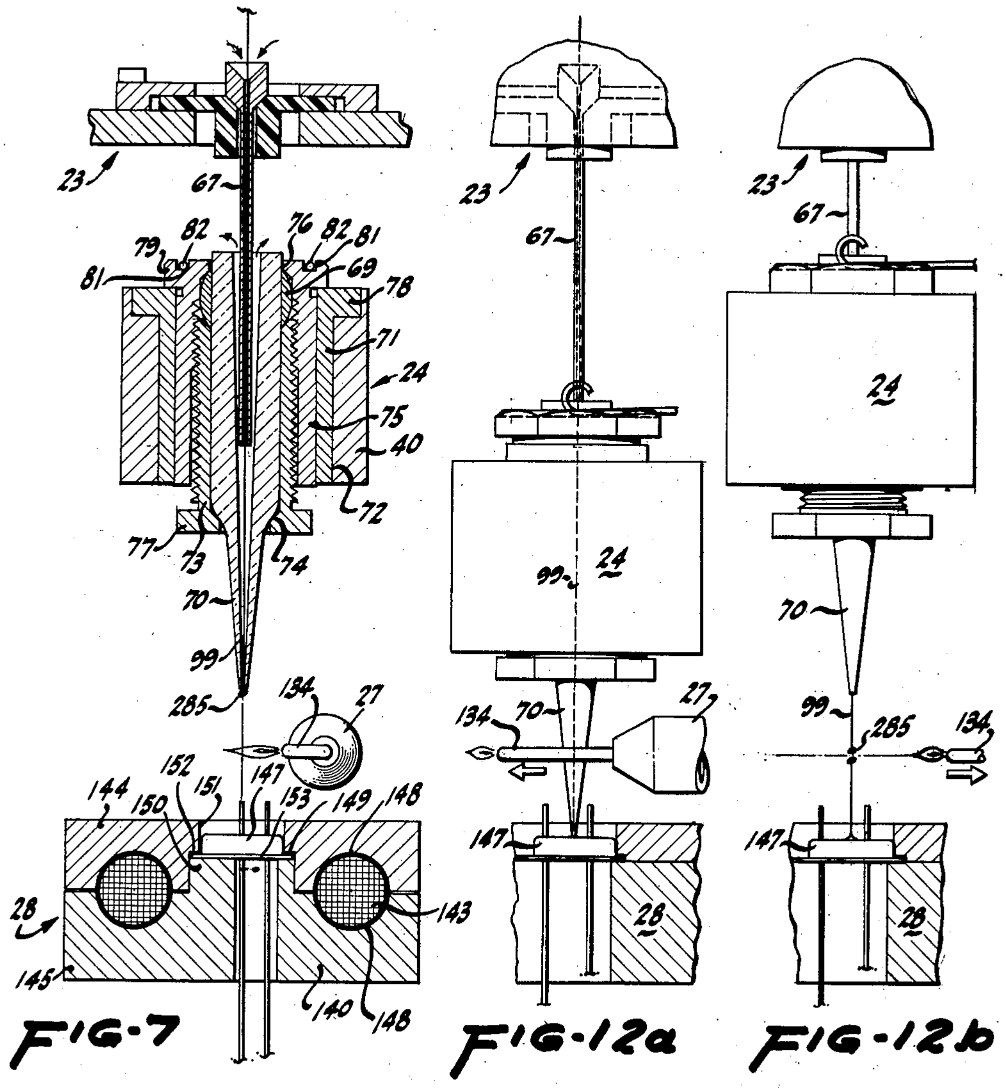
FIG. 7 is a sectional fragmentary view taken along line 7—7 of FIG. 3.
Figure 13:
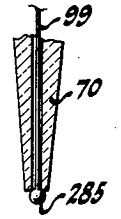
Figure 14:
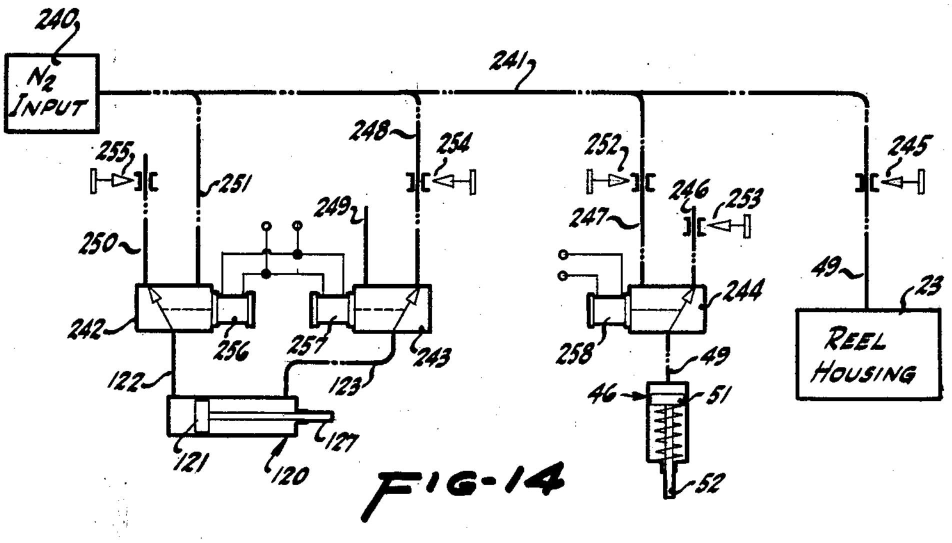
Figure 15:
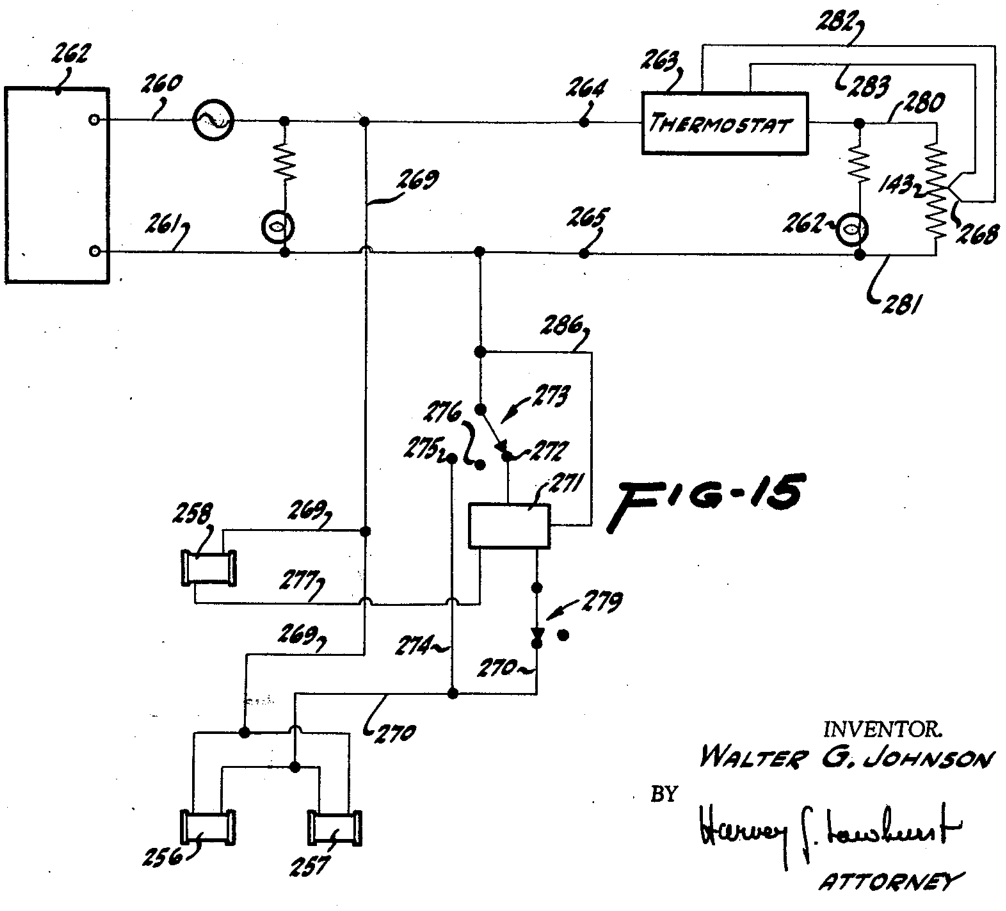

FIGS. 12*a* and 12*b* are explanatory views similar to the view of FIG. 7 showing several progressive positions of the stage during its operation;

FIG. 13 is an enlarged view of the capillary and the ball formed on the end of the lead by the torch;

FIG. 14 is a schematic hydraulic flow diagram showing the various valves and valve control means for operating the lead bonding machine of this invention; and FIG. 15 is a schematic electrical circuit diagram showing the valve actuating means and timing means for operating the lead bonding machine of this invention.

Figure 1:
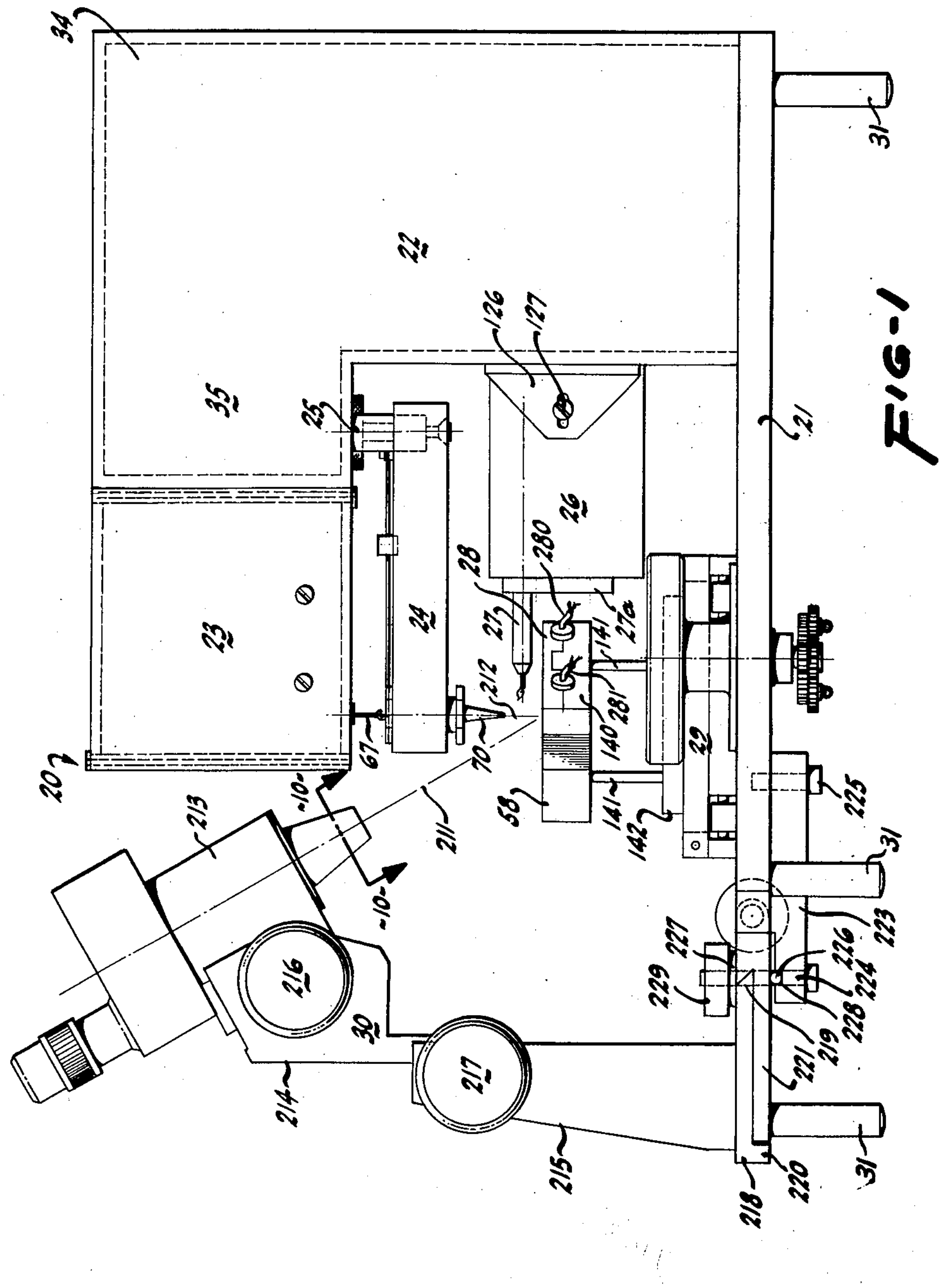
FIG. 1 is a side elevational view of the lead bonding machine of this invention.

Referring now to the drawings in which like reference characters designate like parts, and preliminary to FIG. 1 thereof, there is shown an embodiment of the lead bonding machine of this invention generally designated by reference character 20, useful for forming thermocompression bonds for attaching leads to the dice of a transistor. Machine 20 essentially comprises a base plate 21, a body housing 22 mounted upon base plate 21, a lead reel housing 23 detachably secured to body housing 22 and housing the lead, and a compression stage 24 carried by a pneumatically actuated reciprocating mechanism 25 located in housing 22.

Machine 20 also comprises a torch housing 26 mounted to body housing 22 and accommodating a pneumatically actuated reciprocating mechanism 27*a* for reciprocating a torch 27, a thermostatically controlled heated header holder 28 mounted upon a micromanipulator mechanism 29 carried by base plate 21 and a microscope 30 adjustably mounted upon base plate 21.

Figure 2:
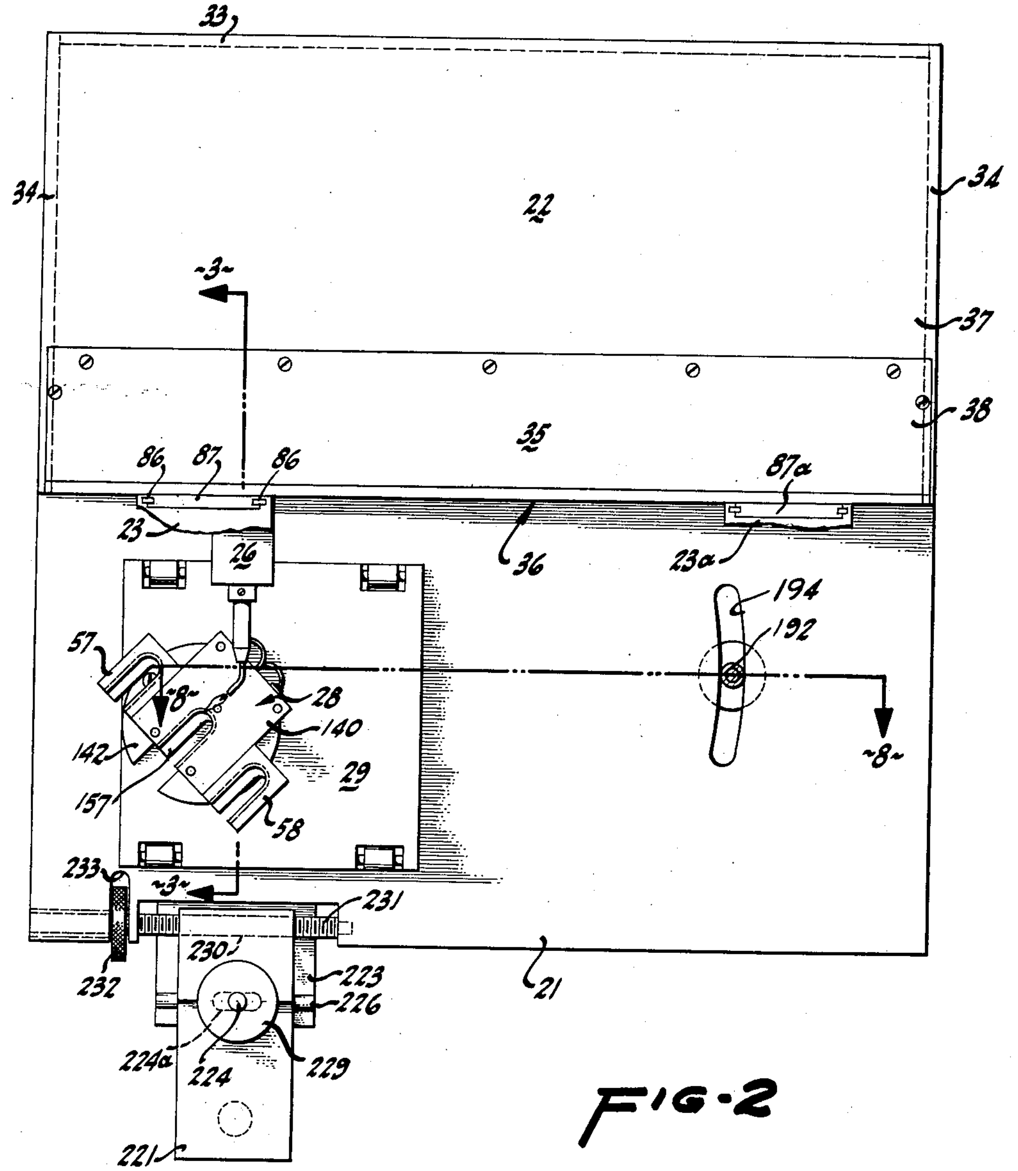
FIG. 2 is a top view of machine of FIG. 1 with a portion of the reel housing and the entire microscope removed.
Figure 3:
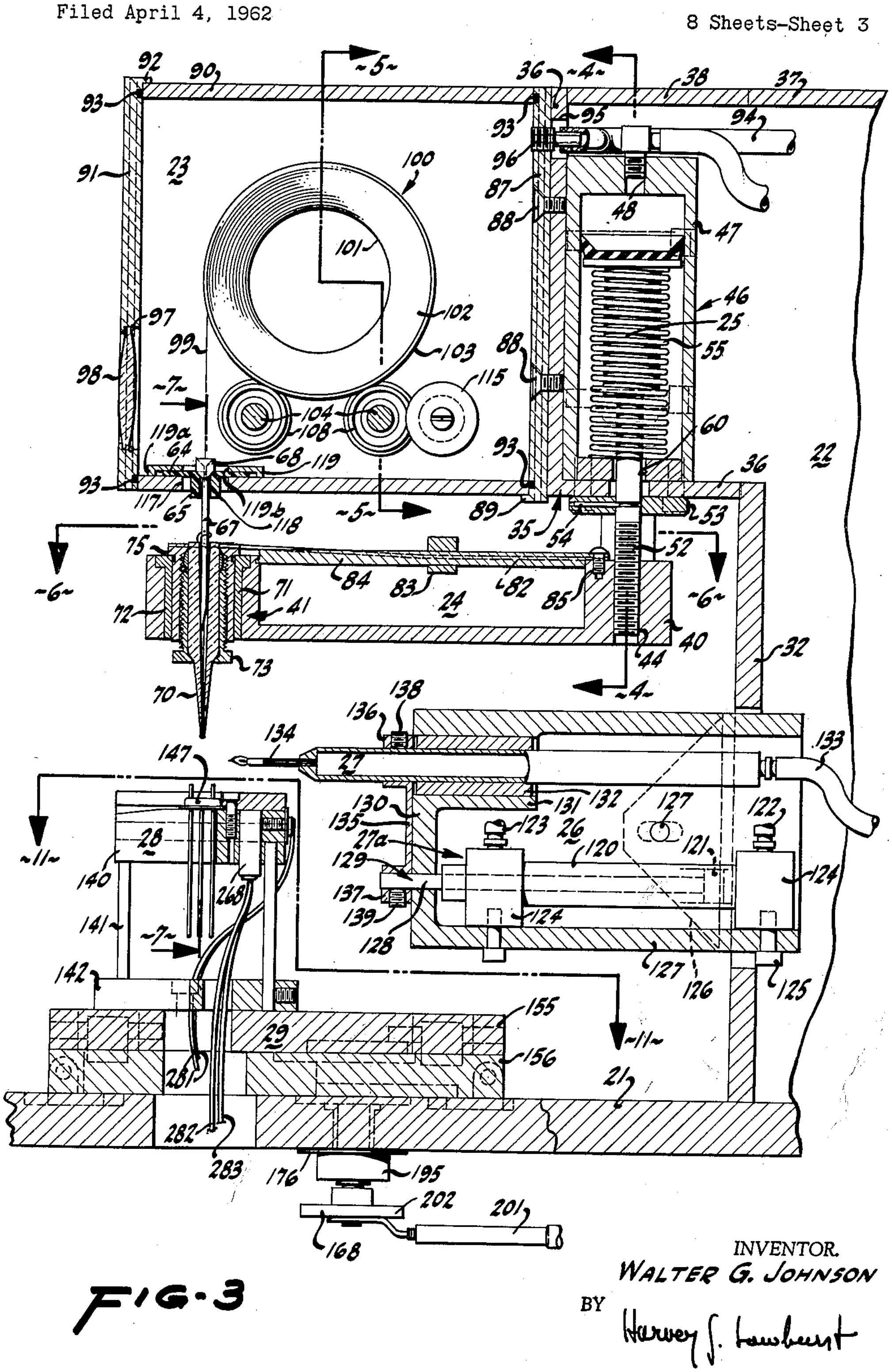
FIG. 3 is an enlarged sectional fragmentary view taken along line 3—3 of FIG. 2.

Referring more particularly to FIGS. 1, 2 and 3, base plate 21 may be formed of a suitable rigid material such as aluminum. If found convenient, base plate 21 may be supported in a raised position upon a flat surface by means of legs 31 affixed to the underside to provide a stable support. The length of legs 31 is selected to provide sufficient space between the supporting surface and base plate 21 to allow mounting of certain parts of micromanipulator mechanism 29 to the underside of base plate 21.

Body housing 22 may comprise a low front wall 32 and a high rear wall 33, both of which are parallel and extend all the way across base plate 21. A pair of side walls 34, of inverted L-shaped configuration, extend between front and rear walls 32 and 33 and are fastened thereto to form housing 22. The inner and outer shank portions of side walls 34 are of the same height as front and rear walls 32 and 33 respectively, and the forward projecting leg portions of side walls 34 form an overhang portion 35 which may be enclosed with an L-shaped structural front closure member 36 as is best seen in FIG. 3. A top cover 37 having a readily removable panel section 38 is affixed to rear wall 33, side walls 34 and closure member 36 to completely enclose body housing 22. All walls and covers of body housing 22 may be of sheet metal stock and structural members suitably secured to one another and to base plate 21 by conventional fastening means such as screws or, if a more permanent connection is desired, by weld. Removable section 38 provides ready access into body housing 22 and may be utilized to cover the various operational controls such as switches and meters.

Figures 4, 5:
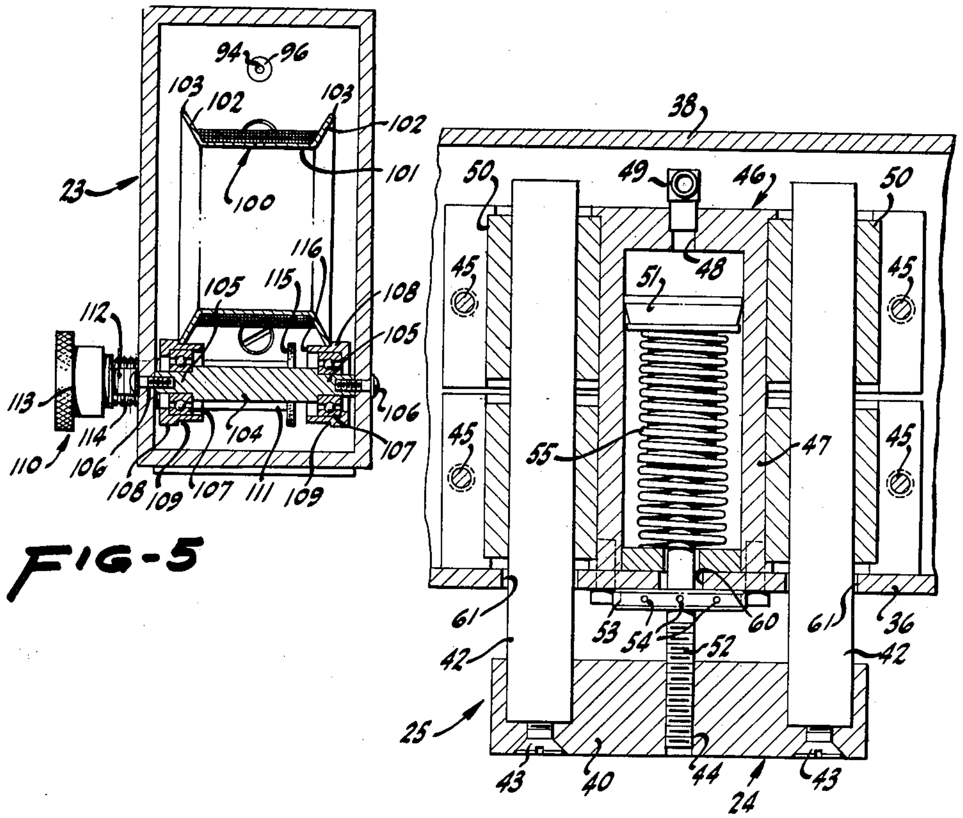
FIG. 4 is a sectional fragmentary view taken along line 4—4 of FIG. 3.
FIG. 5 is a sectional fragmentary view taken along line 5—5 of FIG. 3.
Figure 6:
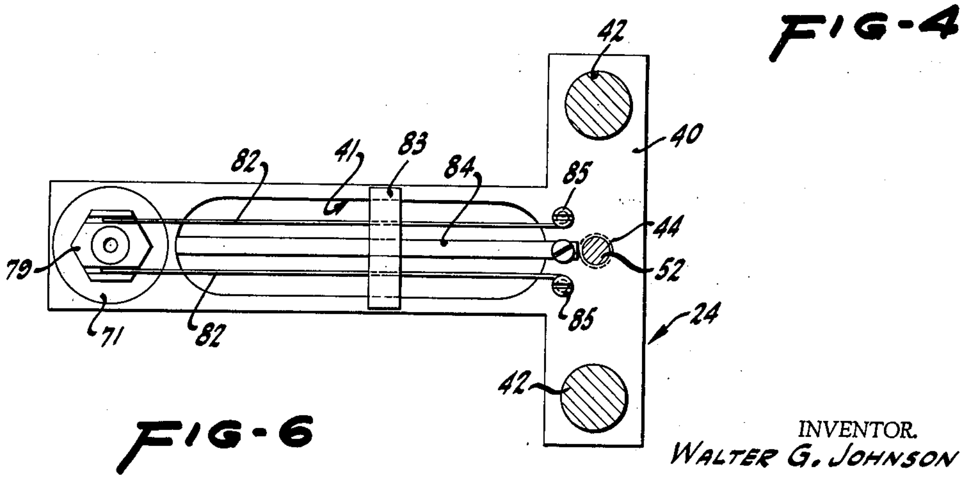
FIG. 6 is a fragmentary top view taken along line 6—6 of FIG. 3.

Compression state 24, carried by pneumatically actuated reciprocating mechanism 25 as best shown in FIGS. 3, 4 and 6, comprises essentially a T-shaped stage member 40 formed with a groove 41 in its leg portion to lighten the member. A pair of cylindrical slide posts 42 are rigidly secured in openings formed in respective end portions of the cross bar section of member 40 by means of screws 43. Threaded opening 44 is provided at the center of the cross bar section of the member 40 to engage the threaded end portion of a piston connecting rod 52.

A reciprocable pneumatic ram 46 is securely fastened to the vertical and/or horizontal inner surface of closure member 36 in overhand portion 35 by screws 45. Pneumatic ram 46 comprises a cylinder 47 having an opening 48 for communication with a pneumatic high pressure line 49. A piston 51 is slidingly disposed in cylinder 47 and has attached thereto a piston connecting rod 52.

Spaced on opposite sides of ram 46 and preferably (as shown) but not necessarily, forming part thereof, are a pair of guide sleeves 50 for slidingly and guidingly engaging cylindrical posts 42. In this manner, stage member 40 may be vertically reciprocated by the up and down motion of piston 51 and is fully guided during such motion by the engagement of posts 42 with sleeves 50.

To permit connecting rod 52 and posts 42 to pass through the horizontal portion of closure member 36, clearance holes 60 and 61 are provided. To limit the upward motion of piston 51, a stop member 53 having a threaded opening for engaging threaded piston rod 52 is securely pinned in position by pin 54. Since ram 46 is single acting, an extension spring 55 is inserted between the bottom surface of cylinder 47 and the lower surface of piston 51 to urge piston 51 upwards. The upper position of piston 51 is determined by the position of stop member 53 which stop member is positioned to provide optimum ram operation.

Stage member 40 carries a retractable, spring loaded glass capillary 70, as best seen in FIG. 7. More particularly, a bushing 71 having a collar 78 and preferably made of a bearing metal is press-fitted into an undercut bore 72 on the far end of the leg section of stage member 40. Capillary 70 is clamped between an inner sleeve 73 having a threaded outer portion and having a constriction or throat 74 formed at its lower end for engaging the tapered shoulder portion of capillary 70 and an outer sleeve 75. An outer sleeve 75 engages the threaded outer portion of inner sleeve 73 and also includes a tapered shoulder 76 for engaging a plastic ferrule 69 surrounding capillary 70. As outer sleeve 75 is threaded into inner sleeve 73, tapered shoulder 76 squeezes ferrule 69 against a tapered end portion of sleeve 73 and thereby against capillary 70 holding it firmly in place.

The outer surface of outer sleeve 75 is dimensioned to slidingly fit into the bore of bushing 71. A shoulder 79 on sleeve 75 provides a stop means engaging the upper surface of bushing 71. In order to permit easy removal of capillary 70, a shoulder 77 on inner sleeve 73 is made sufficiently small to pass through bushing 71. In this manner a retractable capillary holding fixture is provided which is vertically slidable in stage member 40.

Outer sleeve 75 holding capillary 70 is spring loaded and retractable with respect to stage member 40, as is best seen in FIGS. 6 and 7. A pair of shallow longitudinal grooves 81 in outer sleeve 75 engage a pair of wire or leaf springs 82 which urge the outer sleeve 75 and thereby clamped capillary 70 downward until shoulder 79 seats on the upper surface of bushing 71. Wire springs 82 are tightly clamped at their other end to stage member 40 by means of screws 85. To provide an adjustment of the spring tension and thereby of the compression force exerted by capillary 70 upon the bonding surface a support bracket 84, extending all the way across slot 41, is mounted to stage member 40 mediate wire springs 82 for supporting a slidably adjustable clamp member 83 which engages both springs 82. Clamp member 83 effectively changes the free length of wire springs 82 so that if greater pressure is desired, member 83 is moved closer to capillary 70.

Consequently, as stage member 40 travels downwards and as capillary 70 encounters the bonding surface, the pressure exerted on the object by capillary 70 depends entirely on the pressure exerted by springs 82 upon retractable outer sleeve 75. As will become better understood in connection with the operation of this invention, the bonding pressure for forming the bond between the lead and the metallized surface is determined by the position of clamp member 83.

Lead reel housing 23, as best seen in FIGS. 3 and 5, is substantially airtight and is demountably attached to a mounting bracket 87 fastened to the front wall of closure member 36 by means of screws 88. A second mounting member 87*a* may be provided as shown in FIG. 2 to hold a spare housing 23*a*. Mounting brackets 87 and 87*a* may comprise a pair of substantially planar members having a stop ledge 89 at their lower extremity, as best seen in FIG. 3, and vertical grooves in its outer edge faces for receiving plastic strips 86, which may be made of nylon or Teflon stock. The reason for providing a mounting bracket for a spare housing is that housings can be conveniently exchanged should a need for a different wire size arise.

Housing 23 may be formed of an extruded piece of rectangular tubing 90 with grooves cut into the inner walls for slidingly engaging plastic strips 86. In other words, one open end of tubing 90 is formed to slidingly engage plastic strips 85 in the edge faces of support bracket 84 and to seat with its bottom surface upon ledge 89. A sliding front panel or cover 91 formed with grooves along its long edge faces for receiving plastic strips in the same manner as bracket 84 may be utilized to close housing 23. A stop ledge 92 located at the upper extremity of cover 91 is provided for seating upon the top surface of tubing 90 so that cover 91 has a well defined "closed" position. Plastic strips 86 which provide for sliding engagement between bracket 84, cover 91 and tubing 90, produce a substantially airtight seal between the various parts making up housing 23. To seal the space between the upper and lower end faces of tubing 90 and bracket 87 and cover 91 respectively, horizontally disposed plastic sealing strips 93 of Teflon or similar materials may be mounted in the end members for engagement with such end faces. Housing 23 is pressurized with hydrogen gas as will be explained hereinafter through communication with a hose 94 in body housing 22. Hose 94 passes through a clearance opening 95 in closure member 36 and engages a tapped hole 96 in mounting bracket 87.

Located within housing 23 is a lead reel or form 100 upon which metallic lead 99 is wound. Reel 100 includes a hollow cylindrical core portion 101 and a pair of conical rim portions 102 on either side of core portions 101. Reel 100 and particularly the outer peripheral surfaces 103 of rim portions 102 are machined to be true round with respect to core portion 101. A pair of bearing support shafts 104 are mounted across housing 23 by affixing its axial trunnions 105 to opposite walls. To this end, trunnions 105 are provided with axially extending tapped holes for engaging screws 106 passing through opposite side walls of tubing 90.

Each trunnion 105 engages the inner race of a non-friction device such as bearing 107. A guide sleeve 108 is fitted upon the outer race of bearing 107 and each guide sleeve 108 is provided with an inward facing shoulder 109. Separation between facing shoulders 109 is carefully selected to be equal to or silghtly larger than the width of reel 100 so that outer peripheral surfaces 103 of rim portions 102 can seat upon sleeves 108 between shoulders 109. Shoulders 109 thereby prevent lateral motion of reel 100 as wire 99 is being unwound.

At times it has been found convenient to rotate reel 100 from outside reel housing 23 either to rewind or to unwind lead 99. To this end, a reel manipulator 110 is provided which includes a spindle or shaft 111 having an axial trunnion 112 rotatably journaled in a side wall of housing 23, as best seen in FIG. 5. Trunnion 112 projects outside housing 23 and has fastened to its end portion a knurled knob 113 to permit hand manipulation. A retracting spring 114 is placed between housing 23 and knob 113 to urge spindle to the left until the shoulder formed by trunnion 112 abuts the inner surface of housing 23. The right-hand end of shaft 111 (as seen facing FIG. 5) is provided with a friction disc 115 which, when shaft 111 is urged to the right-hand side against spring 114, engages the inner end surface 116 of sleeve 108. In this manner friction between disc 115 and sleeve 108 will rotate sleeve 108 when disc 115 is rotated, thereby rotating reel 100 due to friction between rim portion 102 and sleeve 108.

The bottom wall of housing 23 (as best seen in FIG. 3) is provided with an opening 117 through which lead 99 may pass out of the housing. Since housing 23 is slightly pressurized and since vertical alignment between wire 99 as it leaves housing 23 with capillary 70 is essential to the proper operation of this invention, a laterally floating bushing or seal member 118 made of nylon, Teflon or some other smooth material capable of restricting fluid flow is provided. Floating seal member 118 includes a flat portion 64 and a cylindrical boss 65 which projects downwardly through opening 117. Opening 117 is sufficiently large in diameter to permit limited lateral motion of seal member 118. A seal member housing 119 having a downward extending rim portion 119*a* and an opening 119*b* is fastened to the bottom wall of seal housing 23 to enclose seal 118.

Rim portion 119*a* is shaped and dimensioned to permit seal member 118 the full degree of limited lateral motion imposed by opening 117. In a preferred embodiment of this invention, the periphery of flat portion 64 is non-circular and the inner periphery of rim portion 119*a* is shaped to guide seal member 118 to prevent rotation of the latter by engaging, for example, two oppositely disposed flat side walls of flat portion 64. An opening 66 with a seat in seal member 118 accommodates a lead or wire guide 67 having a mating seating portion 68 for suspending guide 67 vertically.

As is immediately apparent, floating seal member 118 provides housing 23 with a self-adjustable alignment means between wire guide 67 and capillary 70 obviating expensive and time-consuming precision machining of corresponding parts. Further, floating seal member 118 provides a substantially airtight laterally movable seal for opening 117 since the pressure in housing 23 urges seal member 118 into good sealing contact with the top surface of the bottom wall. The opening in level guide 67 is very small and allows only a small volume of the pressurizing gas to escape.

The main reason for pressurizing housing 23 is to provide an air-bearing between lead 99 and the inner wall of level guide 67. Slightly compressed air rushes through level guide 67 at all times causing lead 99 to "dance" instead of sticking to the tubular wall. The dancing head is then easily pulled out of housing 23 by main stage 24 during its downward stroke.

It has been found convenient at times to provide visual access into housing 23 by way of placing lenses, such as lens 98, into the various walls and the cover. Lens 98 is held in place by a snap-in ring 97.

Torch housing 26 is mounted by means of a pair of side brackets 126 and screws 127 to low front wall 32 of body housing 22 and encloses the torch reciprocating mechanism 27*a*. Mechanism 27*a* includes a double-acting pneumatic ram assembly 120 to which a pair of pressure lines 122 and 123 are connected. Ram 120 is mounted, by means of a pair of mounting brackets 124 and screws 125 to bottom wall 127 of housing 26. Dependent plunger 128 (piston rod), connected to piston 121 of ram assembly 120, passes through a suitable clearance opening 129 in front wall 130 of enclosure 26. Front wall 130 also includes an inwardly extending bearing boss 131 for holding a bearing collar 132 which slidingly and guidingly engages the tubular body portion of torch 27. Connected to one tubular end portion of torch 27 is a hose 133 which is sufficiently flexible to permit torch 27 to reciprocate in collar 132, as will be explained hereinafter. Hose 133 supplies hydrogen gas to torch 27 which is burned in a burner or nozzle 134 attached to the other end of the tubular body portion of torch 27.

A bracket 135 having cylindrical clamping bosses 136 and 137 at both ends engage torch 27 and plunger 128 respectively and are securely clamped by means of conventional setscrews 138 and 139. As plunger 128 moves out of ram 120, it laterally displaces bracket 135 to the left, as seen facing FIG. 3, which in turn slidingly moves torch 27 outwardly. Consequently, any axial displacement of piston 121 moves torch 27.

Header holder 28, best seen in FIGS. 1, 2, 3, 7 and 10, comprises a heater block 140 of substantial mass to store and retain heat which is supported on a number of support legs 141 upon a circular support plate 142. Heater block 140 is formed with a U-shaped slot 151 having a recess 152 dimensioned for receiving the flange 153 of a header 147. Heater block 140 accommodates an electrical heating coil 143 and a thermostat 268 for maintaining block 140 at a predetermined temperature as will be explained hereinafter. Header block 140 preferably may be formed of two mating parts, an upper block member 144 and a lower block member 145. Each block member is formed with aligned cutouts for providing slot 151 and with facing aligned semi-circular channels 148 for providing an accommodating channel for heater coil 143. Upper block member 144 has an inner downwardly facing shoulder 149 forming the upper peripheral side of recess 152. Lower block member 145 includes an upwardly depending boss 150 forming the lower peripheral side of recess 152.

It has been found expedient to add to heater block 140 a pair of preheat brackets 57 and 58, as best seen in FIG. 2. Both preheat brackets 57 and 58 are formed with a slot, containing a recess similar to slot 151 and recess 152, to hold a pair of headers prior to their insertion in slot 151 which constitutes the work station of machine 20. The purpose of providing preheat brackets 57 and 58 is to preheat headers prior to their placement into the work station so that no time need be wasted in waiting for the header to reach the desired temperature for forming a thermo-compression bond. Of course, additional brackets may be provided for preheating if found desirable.

Since the prime object of machine 20 is to firmly press the lead projecting from end portion of capillary 70 upon a predetermined point of a metallized surface such as a semiconductive "dice," as the small piece of material bonded to the top of header 147 is commonly referred to, header holder 28 must be provided with adjustment means to accurately position the work piece with respect to laterally fixed capillary 70. To this end, support plate 142 is mounted and actuated for planar horizontal motion by a header holder actuating mechanism or micromanipulator 29 which will now be described in connection with FIGS. 8, 9 and 11.

Micromanipulator 29 comprises an upper actuator plate 155 slidingly mounted to a lower actuator plate 156 which in turn is slidingly mounted to base plate 21. More particularly, base plate 21 is provided with four brackets 157 each of which includes an opening 158. Brackets 157 may be integral with base plate 21 or may be rigidly fastened thereto by conventional means as shown.

Lower actuating plate 156 is formed with four cutouts 159 dimensioned to clear brackets 157 when plate 156 is placed on base plate 21. The width of each cutout 159 is made sufficiently large to permit such limited sliding motion of actuator plate 156 in the direction indicated by arrow 160 (Y-direction) as may be necessary to move header 147 to the various positions for lead attachment. To insure that the motion of plate 156 is confined to rectilinear motion (along the direction of arrow 160), dowel pins 161 are mounted to extend across cutouts 159 to slidingly engage openings 158 in brackets 157. In this manner, plate 156 is slidingly mounted upon base plate 21 for rectilinear motion along the direction of arrow 160.

Upper actuator plate 155 is similarly mounted for linear sliding motion in the direction of arrow 166 (X-direction) upon lower actuator plate 156. To this end, brackets 162, including openings 163, are rigidly mounted to plate 156 and cutouts 164 are formed in plate 155 to clear brackets 162 when upper actuator plate 155 is placed upon lower actuator plate 156. Dowel pins 165 are mounted across cutouts 164 and to slidingly engage openings 163. The width of cutouts 164 is carefully selected to permit the limited degree of linear motion necessary in the direction of arrow 166, and with respect to plate 156, to provide sufficient motion to support plate 142 to enable each point of header 147, to which a lead may have to be bonded, to be brought in alignment with capillary 70.

The micromanipulator structure described so far comprises a first plate 156 mounted to base plate 21 for motion along the Y-direction and a second plate 155 mounted to first plate 156 for motion along the X-direction. Instead of utilizing brackets and dowel pins, it is likewise possible to provide each plate with vertically walled and horizontally extending slots in each corner for engagement with upright pins mounted to the underlying plate. In other words, instead of cutouts, slots extending in the direction of sliding motion may be provided and vertically mounted pins may be utilized. Actuator plates 155, 156 and base plate 21 are each provided with a clearance opening 227 through which electrical wiring from heater coil 143 may be brought below base plate 21.

To move upper actuator plate 155 and thereby header holder 28 along the X-direction the following actuating mechanism is provided in the preferred embodiment of this invention. A first actuator 167 comprises a cylindrical shaft 168 carrying a disk 169 having an eccentrically mounted pin 170. First actuator 167 is rotatably journalled within a second actuator 171. Second actuator 171 comprises a sleeve 172 whose inner bore is dimensioned to rotatably journal shaft 168 in a bearing-like manner. Second actuator 172 further comprises a disk 173 mounted on sleeve 172 carrying an eccentrically mounted pin 174.

Base plate 21 is provided with a two-step counterbored opening 175 (FIG. 8) which is lined with bushing 176. The second counterbore provides a recess for seating the shoulder of bushing 176 whose upper end surface provides a bearing seat for disk 173. The diameter and depth of counterbore is selected to accommodate disk 173 so that only pin 174 projects above the upper surface of base plate 21 (at least in the proximity of the micromanipulator).

Similarly, first plate 156 is provided with a counterbore 177 in its upper surface concentric with an opening 178. Counterbore 177 is dimensioned in depth and diameter to accommodate disk 169 so that only pin 170 projects above the upper surface of first plate 156. Opening 178 is for clearance to permit first plate 156 to move in relation to stationary shaft 168 and sleeve 172.

Engagement between actuator 167 and actuator plate 155 is provided by forming plate 155 with horizontal channel or keyway 181 which slidingly accommodates a slide member 179 having an opening 180 for engaging pin 170. Channel or keyway 181 may be formed by a pair of slide rails 182 fastened to an undercut section in plate 155 and connected thereto by screws 183. Naturally, the direction of extension of keyway 181 (or slide rails 182) must be at right angles to the direction of motion of plate 155, that is, perpendicular to the axis of pins 165. It is easily seen that as shaft 168 rotates, pin 170 describes an arcurate path which path may be resolved into two othogonal motions, one parallel to channel 181 and one parallel to pins 165. These two motions respectively move slide member 179 along keyway 181 and plate 155 along arrow 166 or the X-direction.

Engagement between actuator 171 and actuator plate 156 is provided in a manner similar to the one for engaging plate 155, namely, by forming plate 156 with a channel or keyway 184 which guides a slide member 185 having an opening 186 for engaging pin 174. Key 185 may have a semicircular cut-out portion 187 in the end portion facing sleeve 172 for clearance. Keyway 184 may be formed by two slide rails 188 fastened to a countersunk portion in the lower surface of plate 156 by screws 189. The only reason to countersink the portion to which slide rails 188 are attached is to ensure a flat lower surface of plate 156 which may overlie base plate 21.

Provided the direction of extension of channel 184 is perpendicular to the axis of pins 161, rotation of sleeve 172 will move plate 156 in the direction of arrow 160. It can, therefore, be seen that rotation of shaft 168 moves support plate 142 along the direction of arrow 166 or in the X-direction and rotation of sleeve 172 moves support plate 142 along the direction of arrow 160 or in the Y-direction.

Figures 8, 9, 10:
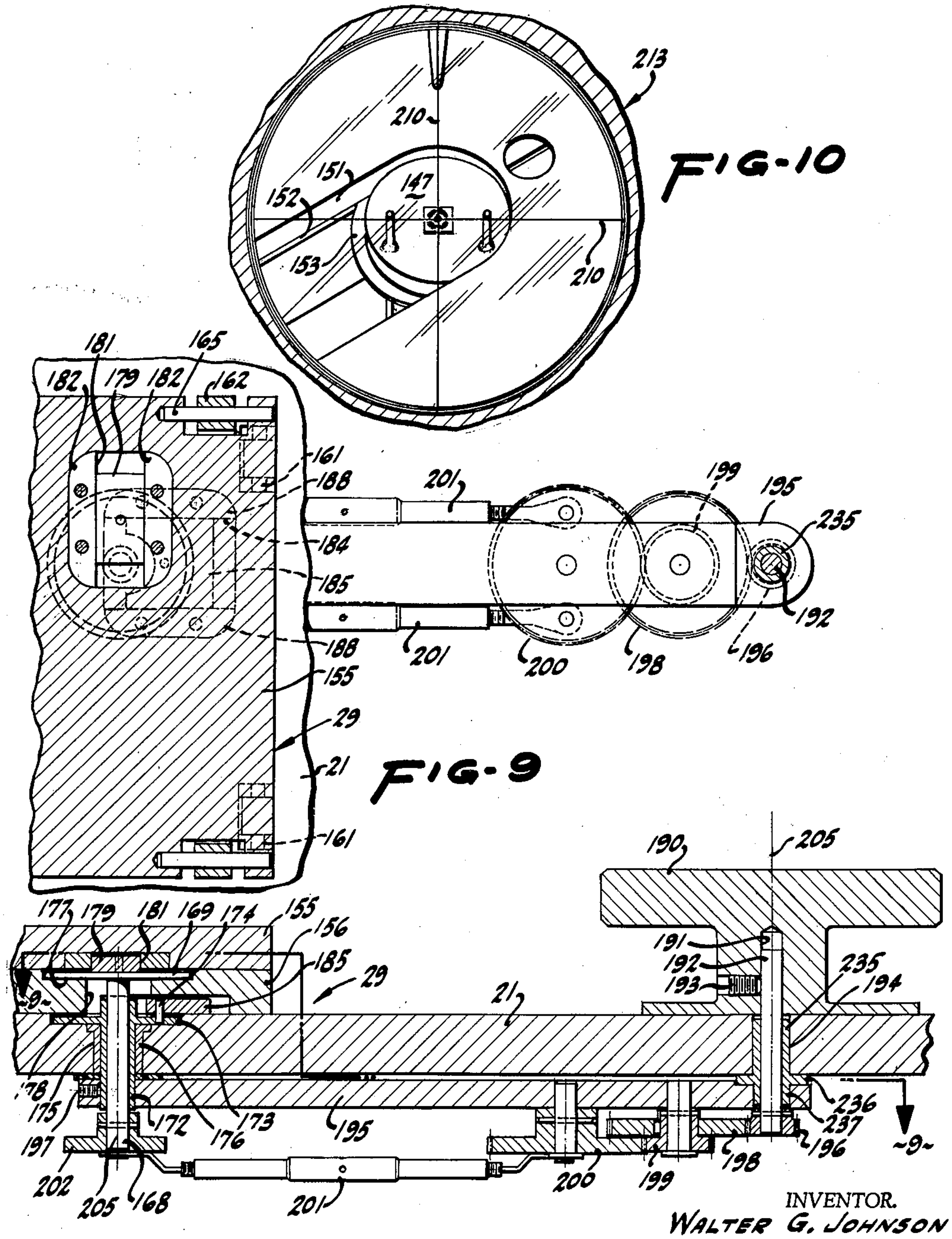
FIG. 8 is a sectional fragmentary view taken along line 8—8 of FIG. 2.
FIG. 9 is a fragmentary top view, partially in section, taken along line 9—9 of FIG. 8.
FIG. 10 is a perspective view including the cross hairs of the microscope, taken along line 10—10 of FIG. 1.

Rotation of shaft 168 and sleeve 172 is provided by means of a manipulator knob 190 (as best seen in FIG. 8) having a bore 191 into which a shaft 192 is fitted and securely clamped by a setscrew 193. Base plate 21 is provided with an arcuate horizontal slot 194 (as best seen in FIG. 2) dimensioned to slidingly accommodate a bushing 235 having a shoulder 236 facing the lower side of base plate 21. Shaft 192 is journalled in bushing 235 which is movable in slot 194. Slot 194 is arcuate about the center line of shaft 168. A lever 195 is provided with an opening through which the lower section bushing 235 may pass. Shaft 192 engages a geared pinion 196 which is firmly affixed to its lower end by a setscrew or some other fastening means (not shown). The other end of lever 195 is provided with an opening through which sleeve 172 passes. A setscrew 197 clamps lever 195 firmly to sleeve 172 so that arcuate motion of manipulator knob 190 imparts an angular displacement to lever 195 and thereby rotates sleeve 172 to move plate 156 along the Y-direction.

Mounted to the lower surface of lever 195 is a gear reduction assembly comprising a first gear 198 having mounted thereon a second gear 199 which engages third gear 200. Gear 198 engages geared pinion 196 so that rotation of knob 190 causes rotation of pinion 196, gear 198, gear 199 which is rigidly affixed to gear 198 and thereby rotates gear 200.

Figure 11:
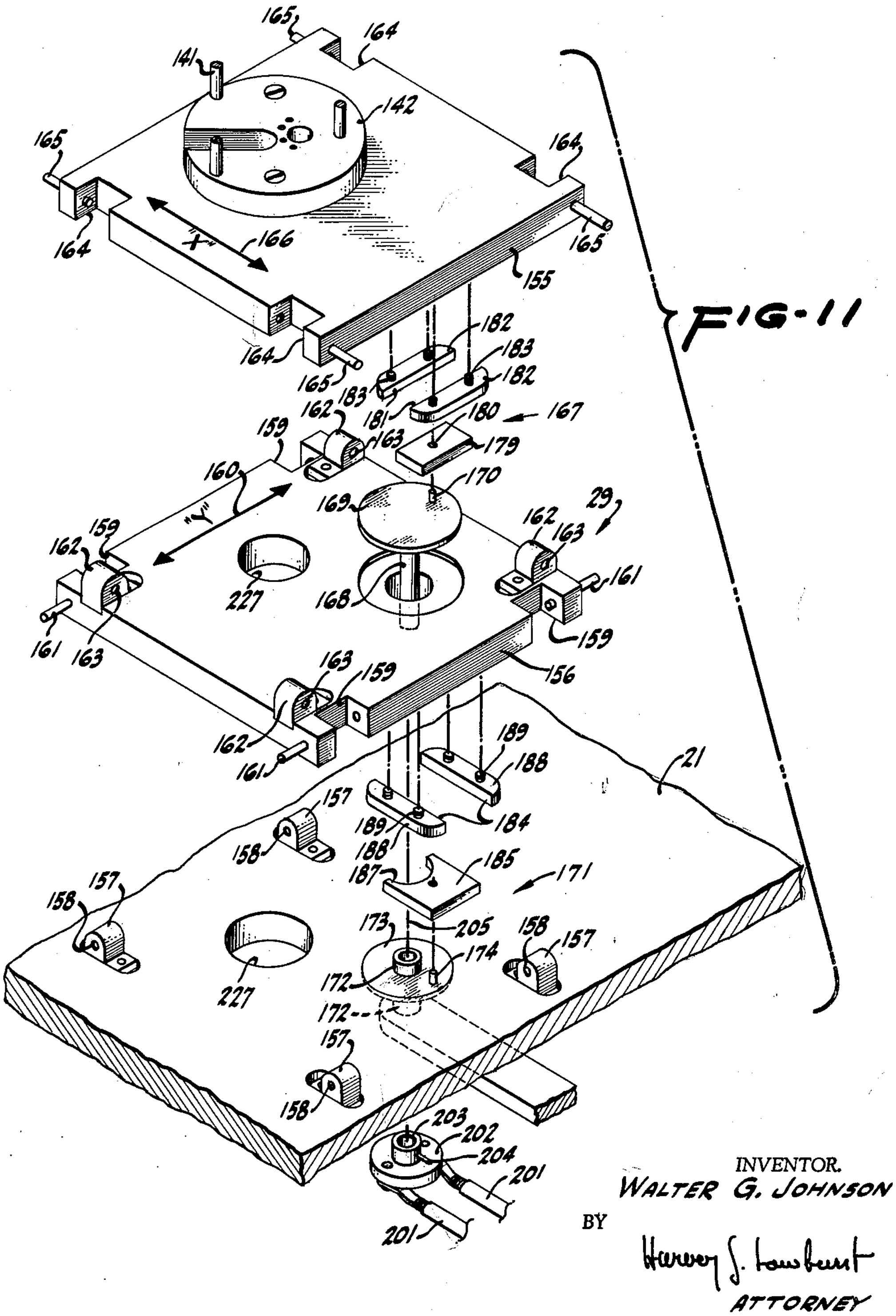
FIG. 11 is an exploded perspective view of a portion of the micromanipular mechanism.

Fastened to gear 200 (as best seen in FIG. 9) are two links 201 which are also connected to a stepped sleeve 202 (as best seen in FIG. 11). Stepped sleeve 202 has a bore 203 dimensioned to engage shaft 168. A setscrew 204 may be utilized to clamp shaft 168 firmly into bore 203 so that upon rotation of sleeve 202, shaft 168 rotates therewith. Rotation of knob 190 about its axis therefore causes rotation of driven gear 200 through the gear reduction assembly and a pulling and pushing of links 201 respectively. This motion of links 201 rotates sleeve 202 and thereby moves plate 155 along the X-direction.

It is also noteworthy that, as knob 190 is moved along its arcuate path 194, without being rotated, the gear reduction assembly moves along with lever 195 and thereby rotates sleeve 202 exactly the same amount as sleeve 172. Consequently, if pins 170 and 174 are mounted the same distance from the center line 205 of the micromanipulator, the motion imparted to plates 155 and 156 is of the same magnitude and support plate 142 moves along a diagonal, i.e., moves in a direction which is at 45 degrees to the X and Y direction, a motion which may be referred to as along the diagonal or D direction.

By way of summary then, rotation of knob 190 about its axis results in motion in the X-direction, and arcuate motion of knob 190 along slot 194 results in motion in the Y-direction. These two motions may be combined by the operator when working knob 190 to micromanipulate any surface portion of header 147 into alignment with vertically moving stage 24.

Microscope 30 may be of standard configuration in which the optical system 213 is adjustably mounted for sliding motion (usually at 30 degrees with the vertical) to a bracket 214 which in turn is adjustably mounted for vertically sliding motion to a base bracket 215, as best seen in FIG. 1. Microscope 30 is mounted, via base bracket 215, upon base plate 21 in such a manner that its line of sight 211 passes through and focuses upon the point defined by the intersection of the stage axis 212 (line of motion of capillary 70) with the horizontal plane containing the upper surface of semi-conductive element 147 (which is also the plane slightly above the capillary mouth when the stage is down).

In other words, microscope 30 is mounted so that upon proper adjustment its crosshairs 210 (see FIG. 10) are focussed at the exact point where the lower end capillary 70 will be positioned during the lowest point of its downward stroke. Actually, the point of intersection of crosshairs 210 is somewhat above the lowest point since capillary 70 is retractable and no bonding pressure is provided until there is a slight retraction so that leaf springs 82 become operative.

Microscope 30 incorporates the conventional adjustment means for moving optical system 213 with respect to brackets 214 and 215. More particularly, optical system 213 is movable with respect to bracket 214 along line of sight 211 which is usually inclined 30 degrees with the vertical axis by manipulating knob 216. Bracket 214 is vertically movable with respect to bracket 215 by manipulating knob 217.

Base 218 of bracket 215 includes a dovetail edge 219 and a dowwnard extending locating ledge 220 for engaging and mating a corresponding mounting plate 221 which is slidably mounted to base plate 21 in such a manner as to permit controlled motion along the right and left direction (Y direction), as seen in FIG. 2.

To mount plate 221, base plate 21 is provided with a substantially rectangular cut-out 222 of sufficient width to permit the desired degree of (X-direction) motion. Mounting plate 221 is supported in cut-out 222 by a bearing plate 223 rigidly fastened to the lower surface of base plate 21 by screws 225. A smooth bearing pin 226 made of a low friction material such as nylon, is held in place in groove 228 to provide guiding motion for mounting plate 221.

A screw 224 passes through bearing plate 223 and an elongated slot 224*a* in mounting plate 221 and is secured in place by threaded nut 229 above a low friction material washer 227. A threaded passage 230 in mounting plate 221 engages a threaded lead screw 231 which is journaled at both of its ends in base plate 21. A knurled knob 232 is rigidly connected to lead screw 231 to facilitate rotation of lead screw 231 and to thereby move mounting plate 221 sideways. Knob 232 may be accommodated in a slot 233 in base plate 21 to provide a convenient means of securing knob 232 against axial motion.

It is now apparent that optical system 213 may be easily adjusted to focus on the desired point along axis 212. Microscope manipulation as described provides up and down motion by turning knob 217, sideways motion by turning knob 232 and motion along line of sight 211 by turning knob 216.

Stage ram 46 and torch ram 120 are actuated by pressurized gas in a manner to be explained in connection with the description of FIG. 14. Even though a large number of different gases may be used, nitrogen gas has been found very suitable since it may likewise be used to pressurize reel housing 23 to provide a non-oxidizing atmosphere for lead 99. As previously indicated, stage 46 is a single acting ram whose piston connection rod or plunger 52 is forced outwards when gas under pressure enters through gas line 49. Torch ram 120 is a double acting ram whose piston connecting rod or plunger 128 moves outwards when gas under pressure enters gas line 122 and moves inwards when gas under pressure enters gas line 123.

Referring now to FIG. 14, a tank 240 of pressurized gas, such as nitrogen, is connected, via main gas line 241, to three solenoid operated valves 242, 243, 244, and to reel housing pressure line 49. Interposed between main gas line 241 and reel housing pressure line 49 is a flow control valve 245 for controlling the pressure of gas into pressurized reel housing 23. The pressure in main gas line 241 is selected in accordance with the dimensions of the various rams and their required operating forces and a pressure of 25 lbs. per sq. inch has been found suitable in operating machine 20. Likewise, flow control valve 245 is adjusted so that reel housing 23 is sufficiently pressurized to cause nitrogen escaping through capillary 70 to provide an air-bearing for moving lead 99.

Solenoid operated valves 242, 243 and 244 are shown as three-way valves for connecting a ram either with the main gas line 241 or with the atmosphere for exhaust. More specifically, stage ram 46 is connected through gas line 49 to exhaust line 246 when valve 244 is in the "off" position, and to main gas line 241 via branch gas line 247 when valve 244 is in the "on" position. Similarly, torch ram 120 has one end connected through gas line 123 to main gas line 241 via branch gas line 248 when valve 243 is in its "off" position and to exhaust gas line 249 when valve 243 is in its "on" position. The other end of torch ram 121 is connected, through gas line 122 to exhaust gas line 250 when valve 242 is in its "off" position and to main gas line 241 through branch line 251 when valve 242 is in its "on" position.

To control the rate of motion of plunger 52, branch gas line 247 and its exhaust gas line 246 are provided with flow control valves 252 and 253 respectively. For example, if the outward motion of plunger 52 is to be slowed down, flow control valve 252 is adjusted towards its closed position until the volume of gas passed through branch line 247 is decreased to provide the desired piston speed. Similarly, during retraction of plunger 52 caused by the pressure of spring 55 against piston 51, the gas in ram 46 is passed through exhaust gas line 246 and its degree of openness or closeness determines the retraction speed.

The motion of plunger 127 is similarly controlled by use of flow control valves 254 and 255 respectively located in branch gas line 248 and exhaust gas line 250. As will be explained hereinafter, valves 242 and 243 are interlocked so that both are either "on" or "off." When both valves are turned to their "on" position, high pressure gas from branch gas line 251 flows into-the back of cylinder 120 and urges piston 121 outward. Such outward motion decreased the volume in the front of cylinder 124 and gas escapes through exhaust gas line 249. Neither of these lines is controlled in order to obtain a fast forward motion of piston 125.

Control of the return motion of plunger 127 has been found desirable which is provided by flow control valves 254 and 255. When valves 242 and 243 are turned to their off position, high pressure flowing through controlled branch line 248 is adjusted to provide the desired return speed and controlled exhaust line 250 is adjusted to provide the proper back pressure for the desired rate of return. In this manner, a fast forward motion and a controlled slow return motion of piston 121 is provided.

Solenoid controlled valves 242, 243 and 244 are actuated when a current flows through their associated solenoid windings 256, 257 and 258 respectively. Referring now to FIG. 15, a pair of leads 260 and 261 are connected to a source of electric power 262 which provides current for actuating solenoid windings 242, 243 and 244 and also heater coil 143. Heater coil 143 is connected via leads 280 and 281 in series with a thermostatically controlled switch 263 across terminals 264 and 265. A pair of sensor leads 282 and 283 are connected to a sensor element 268 which, upon being exposed to predetermined temperature, provides a current which closes switch 263.

In order to monitor current flow through heater coil 143, a pilot light 262 may be connected across coil 143. Operation of thermostats are well known and require no further explanation. Instead of utilizing a sensor-type switch, it is to be understood that any of the well-known devices for controlling current in response to temperature may be employed.

Lead 260 is also connected via lead 269 to one side of coils 256, 257 and 258. The other side of coils 256, 257 and 258 is connected via leads 270 and 277 respectively to the current output terminals of a timer 271. Timer 271 has the current input terminal directly connected to lead 265 via lead 286. Timer 271 also has a control input terminal which is connected to lead 286 through a single-pole triple-throw switch 273. A separate lead 274 connected to lead 270 bypasses timer 271 and is connected directly to terminal 275 of switch 273. Timer 271 is of conventional construction and is selected to provide various delays to both "on" and "off." For example, a timer manufactured by Automatic Timing & Controls, Inc., King of Prussia, Penn., and referred to as Series 300, has been found entirely satisfactory.

Operation of the circuit of FIG. 15 is as follows: Thermostatically controlled heater 143 is connected to supply 262 at all times during operation so that heater block 28 remains at a constant selected temperature. Switch 273 is in its "off" position when connected to terminal 276. When operation of the machine of this invention is desired, switch 273 is thrown to terminal 272 and timer 271 becomes operative to immediately connect lead 277 with lead 286 thereby actuating solenoid 258 and lowering stage 24. After a preset time, timer 271 disconnects leads 277 from lead 271 deenergizing solenoid 258 so that stage 24 goes back to its original position.

At the end of the preset stage operating period, or shortly thereafter, timer 271 connects again for a preset length of time lead 270 to lead 261 to operate solenoids 256 and 257 and thereby torch 70. As will be explained, the sequence and timing are of importance. In case only torch operation is desired without stage operation, switch 273 is connected to terminal 275. At certain times, it is necessary to operate the stage without the torch (when alternately "nail head" bonding and "wedge" bonding). For this purpose, a switch 279 may be provided which, when open, prevents solenoids 256 and 257 from becoming energized when timer 271 is actuated for normal sequence operation.

In operation, reel 100 has metallic lead 99 wound thereon and is inserted into reel housing 23. Lead 99 is threaded through capillary 70. The metallized surface to which lead 99 is to be bonded, such as header 147, is inserted into a holder such as header holder 28. In case of compression bonding, the holder may be left at room temperature. In case of thermo-compression bonding, header holder 28 is thermostatically heated to, say, 300 degrees centigrade for bonding a gold lead to a silicon dice.

Header 147 is then moved by means of micromanipulator 29 until the exact spot of the mesa to which the lead is to be bonded coincides with the crosshairs of microscope 30. To provide the proper pressure, clamp member 83 is adjusted so that springs 82 exert the proper pressure upon retractable capillary 70. In case of bonding gold wire to a silicon dice, a pressure of about 20,000 lbs. per sq. inch has been found satisfactory. Also, timer 271 is set to provide the proper time interval for compression which for bonding gold to silicon may be of the order of 3 seconds.

There are essentially two different types of bonding methods which the machine of this invention is eminently suitable to perform, each one requiring a somewhat different mode of operation. One of these bonding processes is commonly known as "nail head" bonding in which a ball is formed at the end of the lead wire below the capillary and this ball is compressed into the shape of a nail lead by the capillary as the stage is lowered. The other process is known as "wedge" bonding in which the end of the lead wire is bent away from the tip of the precision ground capillary 70 so that when the stage is lowered, the lead wire is compressed between the lower flat-ground surface of the capillary tip and the metallized surface.

Operation of this machine to produce "nail head" bond is as follows. After head 147 has been positioned to the proper bond area of the mesa and has reached the bonding temperature, lead 99 is cut but the finely controlled hydrogen flame of torch 27 which is actuated by moving switch 273 to terminal 275 and thereby moving torch ram 120. The cutting of lead 99 by the flame produces the ball 240 shown in FIG. 13 at the end of lead 99.

Once a ball 285 is formed on lead 99, the bonding operation becomes automatic. FIG. 7 depicts the commencement of the automatic operation. Switch 273 is moved to terminal 272 to actuate timer 271 which lowers stage 24 for a predetermined duration so that capillary 70 forms a tough permanent "nail head" bond to the mesa as shown in FIG. 12*a*. Timer 271 actuates torch ram 120 just after disconnecting solenoid 258 and before stage 24 has had time to move upwards so that the flame, during the fast forward stroke of torch 27, passes capillary 70 which protects lead 99 from the flame. This is shown in FIG. 12*a* in which nozzle 134 is in its forward position. As soon as stage 24 is raised, timer 271 actuates the slow return stroke of torch 27 which cuts the wire and thereby forms a ball 285 for the next bond. This is shown in FIG. 12*b* in which torch 27 just cut lead 99 forming a ball 285 in each end.

From this sequence of operations it is immediately seen that timer 271 must be set so that torch 27 advances to its forward position before lead 99 is exposed by raising of capillary 70. Also the speed of the return stroke of torch 27 must be sufficiently low to produce a ball.

Operation of the machine to produce a wedge bond is somewhat similar except that no ball need be formed. After positioning the mesa to the proper bonding position, the lead projecting through capillary 70 is bent upwards or otherwise caused to engage the ground flat tip of capillary 70 and stage 24 is lowered by moving switch 273 to terminal 272 after opening switch 279. The lead can be cut by moving switch 273 to terminal 275 as explained above. Of course, switch 279 need not be opened since there is no objection to forming a ball as long as, prior to the next downward stroke of stage 24, a small length of lead 99 is pulled out of capillary 70 and bent for the next wedge bond.

The machine of this invention may also be operated to first produce a "nail head" lead bond between the mesa and lead 99 and thereafter, without being cut, to connect bonded lead to the post of header 147 by a "wedge" bond. In the production of transistors, this is, of course, a most desirable operation. To provide "nail head" and "wedge" bonds alternately, operation commences as explained in connection with "nail head" bonding. Switch 279 is opened prior to the first downward stroke of stage 24 to form the ball. After the ball is formed, switch 284 is closed, header 147 is moved so that the desired post is lined up with the microscope cross hairs and stage 24 is brought down again by operating switch 273 to terminal 272. Since lead 99 is still bonded to the mesa before stage 24 comes down a second time, lead 99 makes an angle with the vertical and engages the ground flat tip. As stage 24 is retracted, torch 27 cuts lead 99 and forms a ball for the next nail head bond.

There has been described a bonding machine to form compression and thermo-compression bonds between a metallic lead and a metallized surface. The machine includes a workpiece holder which may be adapted to hold a workpiece of any desired physical configuration either for cold or hot bonding and which is mounted upon a micromanipulator capable of providing X direction and D direction by manipulating a single knob. The machine is provided with a spring loaded retractable capillary which affords a means of adjusting the pressure of the compression stroke. Additionally, a torch means is provided and interlocked with the main stage operation to cut the lead after bonding and to form a ball on the lead useful in practicing the nail head bonding process. In certain embodiments of this machine in which the thermo-compression process of bonding is practiced, the time necessary to bring the metallized surface to the bonding temperature can be materially reduced by use of auxiliary workpiece holders clamped in intimate thermal contact to the thermostatically controlled heater block for preheating.

Even though the X machine of this invention has been described with particular reference to the thermo-compression bonding of leads to transistors, it is to be understood that such a specific description is given by way of example only. The machine is easily adaptable to cold compression bonding and also to bonding of leads to any surface by modifying the workpiece holder accordingly.

What is claimed is:

1. A lead bonding machine comprising: a base plate; a body frame mounted upon said base plate; a reel housing detachably secured to said body frame; a reel of fine lead rotatably supported within said reel housing, said reel housing including an opening for dispensing said lead; a reciprocative compression stage carried by said body frame and including a retractable spring loaded capillary tube having a fine bore for receiving said lead; a reciprocative torch carried by said body frame for motion in a direction substantially perpendicular to the direction of motion of said compression stage; and a micromanipulator including a workpiece holder carried by said base plate for manipulating a workpiece in a plane perpendicular to the direction of motion of said compression stage.

2. A lead bonding machine comprising: a base plate; a body frame mounted upon said base plate; a reel housing detachably secured to said body frame; a reel of fine lead rotatably supported within said reel housing, said reel housing including an opening for dispensing said lead therefrom; means for providing an air-bearing between said opening and said lead; a reciprocative compression stage carried by said body frame and including a retractable spring loaded capillary tube having a bore for receiving said fine lead; a flame carrying torch carried by said body frame, said torch being movable so that said flame intercepts said fine lead on the side of said compression stage opposite said reel housing; a micromanipulator for providing controlled planar motion in a plane perpendicular to the axis of motion of said compression stage carried by said base plate; a workpiece holder mounted upon said micromanipulator; and a sighting microscope carried by said base plate and sighting on a point which forms the intersection of said axis of motion with a plane perpendicular to said axis of motion and containing the workpiece portion to which said lead is to be bonded.

3. A lead bonding machine comprising: a base plate; a body frame mounted upon said base plate; a reel housing detachably secured to said body frame; a reel of fine lead rotatably supported within said reel housing, said reel housing including an opening for dispensing said lead therefrom; a reciprocative compression stage carried by said body frame and including a retractable spring loaded capillary tube having a bore whose center line defines the working axis of said machine which extends parallel to the axis of motion of said compression stage, said bore receiving said fine lead; a reciprocative torch, including a nozzle for supporting a flame, carried by said body frame, the path of said flame being selected to be substantially perpendicular to and intercepting said working axis during reciprocation; a micromanipulator including a workpiece holder mounted to said base plate for adjustable planar motion of a workpiece perpendicular to said working axis; a sighting microscope carried by said base plate and sighting on a point which forms the intersection of said working axis with a horizontal plane containing the portion of the workpiece to which said lead is to be bonded; and means for synchronizing the motion of said torch with the motion of said compression stage.

4. A lead bonding machine comprising: a base plate; a body housing mounted upon said base plate; a reel housing detachably secured to said body housing; a reel of fine lead rotatably supported within said reel housing; a vertically reciprocative compression stage carried by said body housing and including a retractable spring loaded capillary tube having a vertically extending bore whose axis defines a working axis, said reel housing having an opening in substantial alignment with said working axis and said bore receiving said fine lead through said opening; a horizontally reciprocative torch carried by said body housing and including a nozzle for supporting a flame, the path of said nozzle being selected to intercept said working axis below said capillary tube when said compression stage is in its upper position and mediate said capillary tube when said compression stage is in its lower position; a micromanipulator for controlled horizontal motion carried by said base plate and including a workpiece holder for securely holding a workpiece to which said fine lead is to be bonded; a sighting microscope carried by said base plate and sighting on a point which forms the intersection of said working axis with a horizontal plane containing the workpiece portion to which said lead is to be bonded; and actuating means for operating said compression stage and said torch in synchronism.

5. A lead bonding machine in accordance with claim 4 in which: said reel housing includes a chamber and said reel includes a pair of rim flanges; support means in said chamber for engaging the peripheral outer surface of said flanges for rotatably supporting said reel in said chamber; means for pressurizing said chamber with a substantially inert gaseous fluid; spring loaded retractable hand operated means on said housing, said hand operated means being engageable with said support means for rotating said support means and to thereby rotate said reel and advance said lead; and a tubular member accommodated in said opening and having a bore through which said lead wire is dispensed out of said chamber; said tubular member having an elongated tubular sleeve body portion of substantially smaller diameter than said opening and a disk like end portion in said chamber of substantially larger diameter than said opening for limited lateral motion of said tubular member in said opening while sealing the space between said opening and said tubular member, said tubular member having a fine bore of substantially larger diameter than said fine lead through which said fine lead is threaded and through which said gaseous fluid passes to provide an air-bearing for said fine lead.

6. A lead bonding machine in accordance with claim 4 in which said compression stage comprises: a substantially horizontally extending body member having first and second end portions; a reciprocating means connected to said first end portion; a retractable capillary tube mounting means slidingly carried by said second end portion and securely holding said capillary tube, said mounting means including a stop means engageable with said body member for limited downward motion of said mounting means; and spring means engaging said mounting means and firmly urging said stop means into engagement with said body member, said spring means including adjustment means to adjust the force necessary for retraction.

7. A lead bonding machine in accordance with claim 4 in which said micromanipulator comprises: a first plate; first mounting means for mounting said first plate to said base plate for rectilinear motion along a first direction; a second plate; second mounting means for mounting said second plate to said first plate for rectilinear motion along a second direction which is perpendicular to said first direction; a tubular member rotatably supported by said base plate; a shaft member rotatably supported within said tubular member and having end portions extending beyond said tubular members; a first actuating member rigid with said tubular member and including a first engagement means eccentric with respect to the axis of said tubular member; a first slide member mounted to said first plate for rectilinear motion along said second direction, said first engagement means engaging said first slide member; a second actuating member rigid with said shaft member and including a second engagement means eccentric with respect to the axis of said shaft member; a second slide member mounted to said second plate for rectilinear motion along said first direction, said second engagement means engaging said second slide member; and a single hand operated means carried by said base plate and coupled to said tubular member and to said shaft member for independently rotating said last two mentioned members to move said second plate to a selected position.

8. A lead bonding machine in accordance with claim 4 in which said workpiece holder comprises: a metallic member having an operational reception station for a workpiece in substantial alignment with said compression stage and further having a plurality of preheating reception stations for other workpieces; means for heating and maintaining the temperature of said metallic member at a selected value; and means for mounting said metallic member upon the micromanipulator, said preheating selection station permitting the preheating of said workpiece prior to their insertion into said operating reception station for bonding.

9. A lead bonding machine for bonding a thin lead to a working surface by the application of pressure for a predetermined time interval, said lead bonding machine comprising: a reciprocative compression stage including a retractable spring loaded capillary tube having an axial bore dimensioned to receive said lead; a lead dispensing means, said lead dispensing means including a pressurized housing, a reel in said housing upon which said lead is wound, a pair of spaced antifriction means extending across said housing and each engaging both outer flanges of said reel to thereby rotatably support said reel, said housing including an opening of substantially larger diameter than said bore and in substantial alignment with said bore through which said lead is dispensed to said bore; and means for actuating said compression stage in such a manner that, during a stroke it will remain in its extended position for said predetermined time.

10. A lead bonding machine for bonding a thin lead to a working surface by the application of pressure, said lead bonding machine comprising: a vertically reciprocative compression stage including a retractable spring loaded capillary tube having an axial bore dimensioned to snugly accommodate said lead; a lead dispensing means, said lead dispensing means including a housing, a reel having a pair of outer flanges in said housing upon which said lead is wound, a pair of spaced antifriction means extending across said housing and each engaging both of said outer flanges to thereby rotatably support said reel, and an opening in said housing substantially larger than and substantially in alignment with said bore through which said lead is dispensed for bonding; an elongated thin tubular body around said lead and passing through said opening, said tubular body having an enlarged end portion larger than said opening for suspending said tubular member, the outer diameter of said tubular body being substantially smaller than said opening to allow limited lateral motion, said enlarged end portion including means for sealing said housing, means for pressurizing said housing with an inert gas so that the escape of said gas through a bore in said tubular body continually agitates said lead and prevents it from sticking to inner surface thereof; and micromanipulator having a workpiece holder for bringing a workpiece in substantial alignment with said compression stage.

11. A lead bonding machine for bonding a thin lead to a working surface by the application of pressure for a predetermined time interval, said lead bonding machine comprising: a vertically reciprocative compression stage including a retractable spring load capillary tube having an axial bore dimensioned to snugly receive said lead; a lead dispensing means, said lead dispensing means including a pressurized housing, a reel having outer flanges in said housing upon which said lead is wound, a pair of spaced antifriction means extending across said housing and engaging the rim of said outer flanges to thereby rotatably support said reel, an opening in said housing, and a laterally movable seal member in said opening including a thin elongated tubular body portion having an inner diameter substantially larger than said lead, the lead passing from said reel through said tubular body portion to said capillary tube; means for forming a ball on the lead on the other side of said capillary tube so that downward moving compression stage pulls said lead of said reel; and means for actuating said compression stage for one cycle in such a manner that said compression stage remains in its downward position for said predetermined time interval.

12. A device for dispensing extremely fine lead wire to the compression stage of a lead bonding machine and comprising: a housing having a chamber and an opening in said chamber; a lead wire carrying spool including a pair of side flanges for containing said lead wire; supporting means in said chamber for engaging the peripheral outer surface of said flanges for rotatably supporting said spool in said chamber; means for pressurizing said chamber with a substantially inert gas; spring loaded, retractable, hand operated means on said housing, said hand operated means being engagable with said supporting means for rotating said support means and thereby rotating said spool and advance said lead wire; and a long tubular member communicating said chamber with the space outside said housing and having a bore for protectively dispensing said lead wire out of said housing and to said compression stage, the diameter of said bore being substantially larger than the diameter of said lead wire, said tubular element having an enlarged end portion in said chamber for suspending said tubular element from said housing for limited lateral motion in said opening, said enlarged end portion also providing a floating seal against the escape of inert gas through said opening.

13. A compression stage for a lead bonding machine in which a fine lead wire is compression bonded to a surface and in which the lead wire is dispensed from a spool by said compression stage, said compression stage comprising: a substantially horizontally extending body member having first and second end portions; a reciprocating means connected to said first end portion; a retractable capillary tube mounting means slidingly carried by said second end portion, said mounting means including a stop means engageable with said body member for limited downward motion of said mounting means; spring means engaging said mounting means and firmly urging said stop means into engagement with said body member, said spring means including adjustment means for selecting a suitable bonding force for said mounting means; and a capillary tube having a fine bore along its length and dimensioned to snugly pass said wire lead for bonding to the surface of a workpiece, said capillary tube being securely fastened to said mounting means.

14. A lead bonding machine for bonding a thin lead to a selected portion of a workpiece by the application of pressure for a predetermined time interval, said lead bonding machine comprising: a stationary main frame; a vertically reciprocative compression stage carried by said main frame and including a spring loaded retractable capillary tube whose bore is dimensioned to receive said lead, the axis of said bore defining the working axis of said machine; a micromanipulator for providing controlled motion in a horizontal plane carried by said main frame; a holder mounted upon said micromanipulator for accommodating a workpiece, said micromanipulator being operable to move said selected workpiece portion into vertical alignment with said working axis; a microscope mounted to said main frame and sightable along a line intercepting said working axis and the horizontal plane containing said selected workpiece portion; and a lead dispenser means mounted to said main frame above and in alignment with said compression stage, said dispenser including a housing, a lead reel with outer flanges, means for rotatably supporting said reel upon its outer flanges, and an opening in the lower portion of said housing and in substantial axial alignment with said work axis for passing said lead vertically out of said housing and through said bore to said selected workpiece portion.

15. A lead bonding machine for bonding a thin lead to a selected portion of a workpiece by the application of pressure for a predetermined time interval, said lead bonding machine comprising: a stationary main frame; a vertically movable compression stage carried by said main frame and including a spring loaded retractable capillary tube having a tapered bore dimensioned to accommodate said lead, the axis of said opening defining the working axis of said machine; a micromanipulator for providing controlled motion in a horizontal plane carried by said main frame; a holder mounted upon said micromanipulator for accommodating a workpiece, said micromanipulator being operable to move said selected portion into vertical alignment with said working axis; a microscope mounted to said main frame and sightable along a line intercepting said working axis and the horizontal plane containing said selected portion; and a lead dispenser means mounted to said main frame above and in alignment with said compression stage, said dispenser means including a pressurized housing, a lead reel, means for rotatably supporting the outer flanges of said reel, an opening in the lower portion of said housing and in substantial axial alignment with said work axis, a lead guard means including an enlarged end portion for suspending said guard means from said housing, and an elongated tubular body passing through said opening, said tubular body being laterally movable in said opening and said enlarged end portion forming a floating seal for said opening, the length of said tubular body being selected to reach into the upper portion of said tapered bore, and said lead passing through said tubular body and through said bore for bonding.

16. In a lead bonding machine of the type in which a reciprocating compression stage carrying a fine lead wire pressure bonds said lead wire to a selected surface portion of a workpiece and thereafter retracts to expose a portion of the lead wire, a reciprocative torch for cutting said lead wire and for forming a ball on the cut portions, said torch comprising: a torch body; and a reciprocating means for actuating said torch carried by said machine, said torch body having a nozzle for supporting a flame, said nozzle being positioned such that the path of said flame intercepts, during reciprocating motion, the exposed portion of said wire lead to cut the same and to form a ball on both cut ends, said reciprocating means including actuating means synchronized with an actuating means for said compression stage to pass said wire lead during its forward stroke when said compression stage pressure bonds said wire lead and protects it from said flame and to pass said wire lead during its return stroke when said compression stage has moved upward and exposed the wire lead for cutting and ball forming.

17. A lead bonding machine in accordance with claim 16 in which said actuating means includes means for providing a fast forward and a slow return motion.

18. A micromanipulator for planar motion comprising: a base plate; a first plate; first mounting means for mounting said first plate to said base plate for restricted rectilinear motion along a first direction; a second plate; second mounting means for mounting said second plate to said first plate for restricted rectilinear motion along a second direction which is perpendicular to said first direction; a tubular member rotatably supported by said base plate; a shaft member rotatably supported within said tubular member; a first actuating member rigid with said tubular member and including a first engagement means eccentric with respect to the axis of said tubular member; a first slide member mounted to said first plate for restricted rectilinear motion along said second direction, said first engagement means engaging said first slide member; a second actuating member carried by said shaft member and including a second engagement means eccentric with respect to the axis of said shaft member; a second slide member mounted to said second plate for restricted rectilinear motion along said first direction, said second engagement means engaging said second sliding member; and a single hand operating means carried by said base plate and coupled to said tubular member and to said shaft member for independently rotating said last two mentioned members to move said second plate to a selected position.

19. A micromanipulator in accordance with claim 18 in which said hand operating means comprises: an elongated member rigidly coupled with said tubular member and supported upon said base plate for limited angular motion; a knob means rotatably carried by said elongated member for angularly moving said elongated member about the axis of said tubular member; an eccentric coupled to said shaft member; and means connecting said eccentric to said rotatable knob means so that rotation of said knob means rotates said shaft member.

References Cited in the file of this patent

UNITED STATES PATENTS

| | | |
|---|---|---|
| 2,904,273 | Turner | Sept. 15, 1959 |
| 2,986,625 | Houda | May 30, 1961 |
| 3,006,068 | Anderson | Oct. 31, 1961 |
| 3,051,026 | Costa | Aug. 28, 1962 |
| 3,056,317 | Huber | Oct. 2, 1962 |
| 3,083,595 | Frank | Apr. 2, 1963 |
| 3,087,239 | Clagett | Apr. 30, 1963 |

OTHER REFERENCES

"New Semiconductor Bonding Technique," Electronic Technician (magazine), September 1957 page 71.